Dec. 5, 1961     C. H. BIBER     3,011,384
PHOTOELECTRIC LEVELING DEVICE
Filed Nov. 22, 1957     3 Sheets-Sheet 1
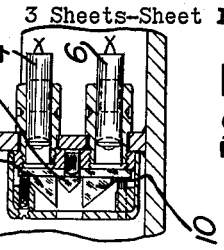
FIG. IV
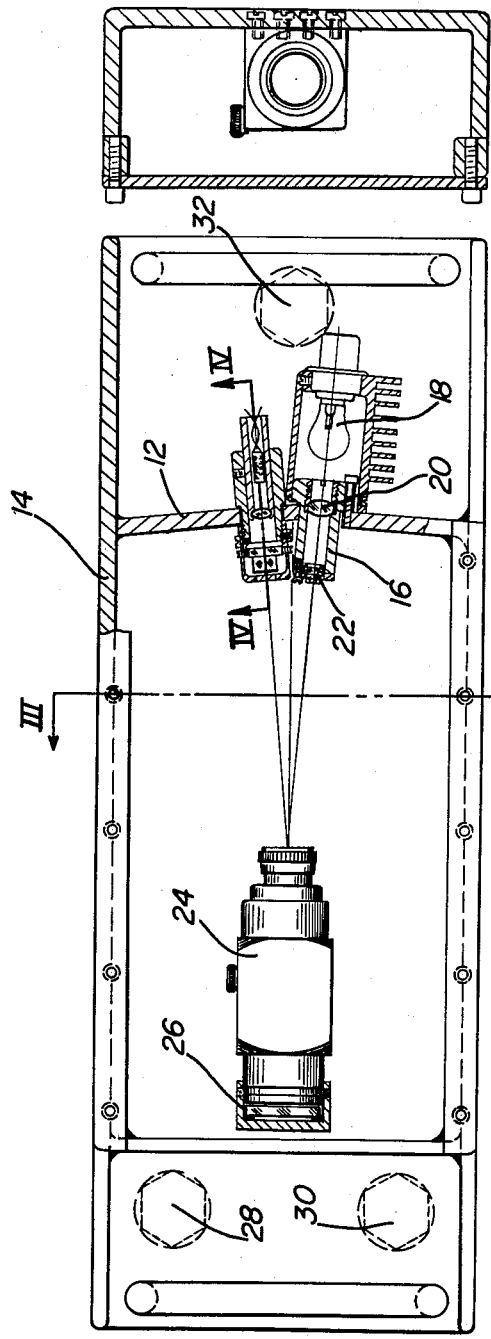
FIG. III
FIG. I
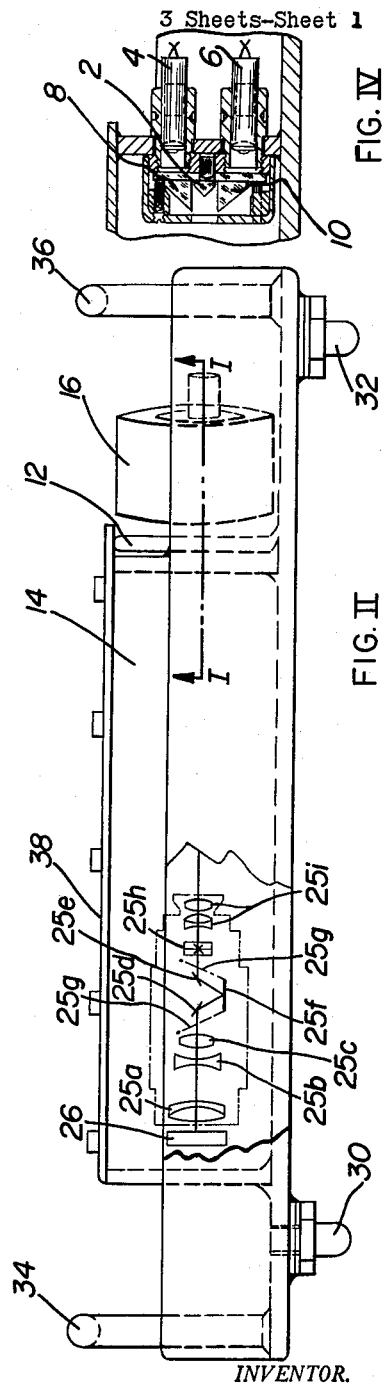
FIG. II
INVENTOR.
CONRAD H. BIBER
BY
J. Russell Juten
ATTORNEY

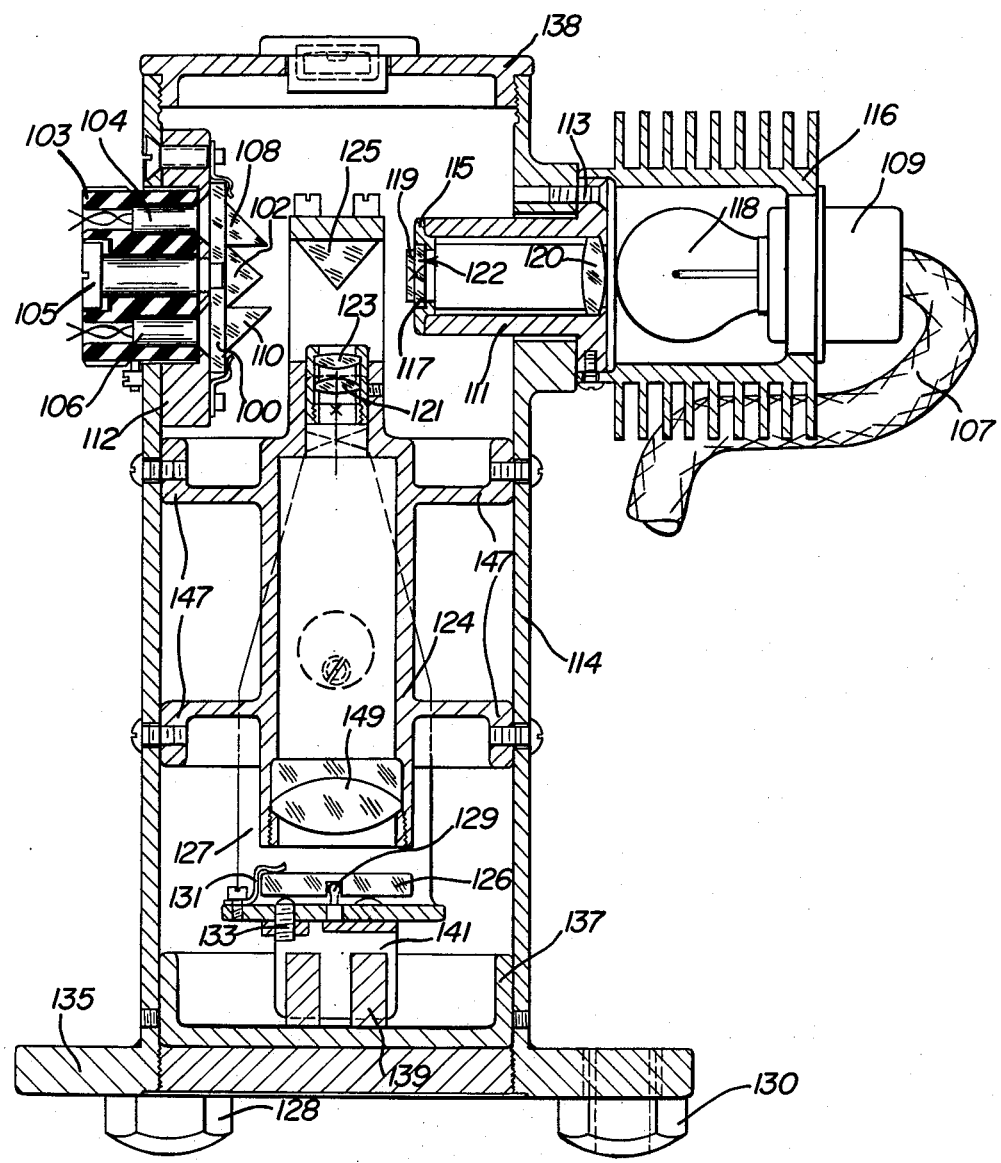
FIG. V
INVENTOR.
CONRAD H. BIBER

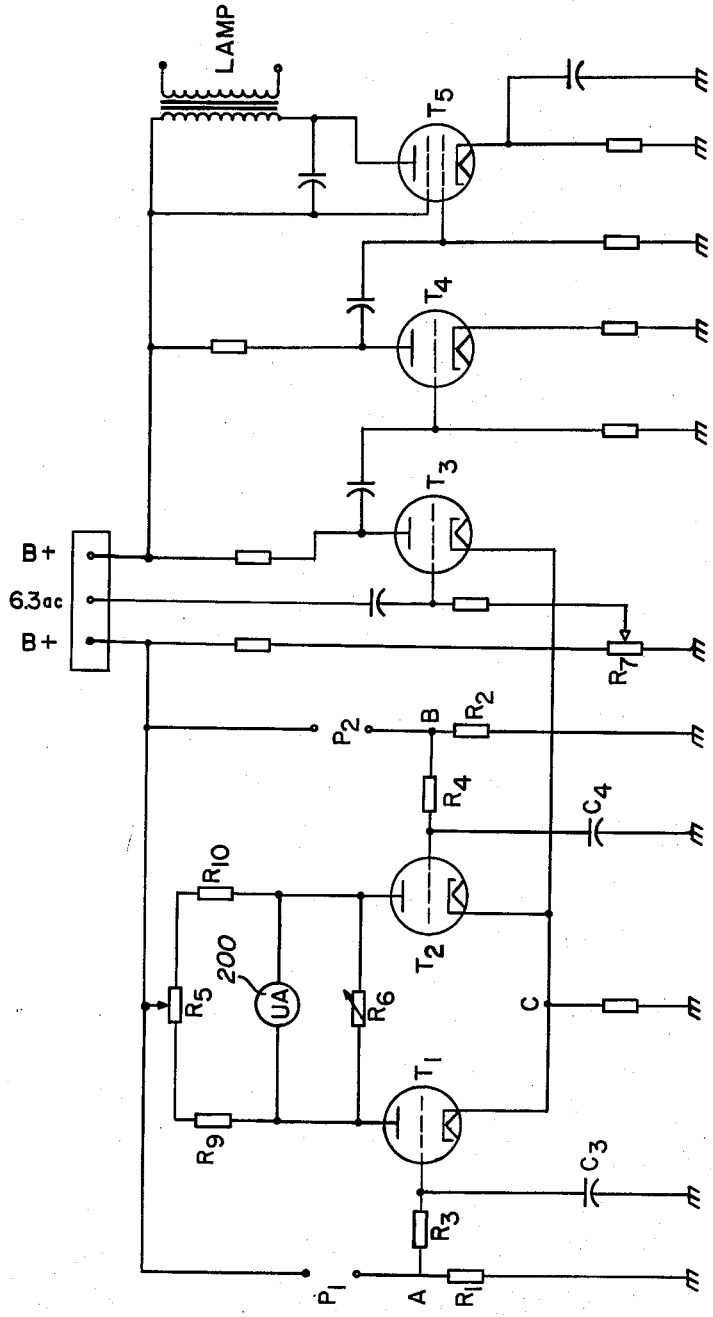
FIG. VI
INVENTOR.
CONRAD H. BIBER

United States Patent Office 3,011,384
Patented Dec. 5, 1961

3,011,384
PHOTOELECTRIC LEVELING DEVICE
Conrad H. Biber, Maplewood, N.J., assignor to Keuffel &
Esser Company, Hoboken, N.J., a corporation of New
Jersey
Filed Nov. 22, 1957, Ser. No. 698,210
8 Claims. (Cl. 88—1)

This invention relates to a level indicating device. More particularly the invention relates to a device which can be applied to a machine, apparatus or piece of equipment which must be kept level in order to indicate whether the piece of apparatus is level. If it is not, the present device will indicate the direction and degree which it is out of level.

The ordinary liquid-filled level vial has been used extensively in the past for this purpose. While the liquid-filled level vial is a highly accurate means of accomplishing this result it does have certain limitations. For example, its sensitivity is limited to a few seconds per 2 mm. decentering of the bubble. It is also difficult to read accurately.

The present invention does not make use of a liquid-filled level vial but makes use of radiant energy receiving means or means which are responsive to de-centered radiant energy. An aperture means or means limiting the radiant energy to a compact bundle of rays is mounted in the path of a source of radiant energy and radiant energy imaging means are used to form an image of this aperture on the means responsive to de-centered radiant energy. The radiant energy imaging means has an angular magnification greater than unity. This is important in order to increase the sensitivity of the device. One of these means is gravitationally controlled by a pendulum in order that the device will be sensitive to the direction of gravity.

One of the principal objects of the present invention is to provide a device which has greater sensitivity to the direction of gravity than an ordinary level vial. The device may therefore be used to indicate with extreme accuracy whether an apparatus to which it has been attached is level. Readings are taken off of an ordinary electric meter which is obviously easier to read than a level vial and which can be read in a remote place. They can also be continuously recorded so that readings may be obtained any time of day or night without the need of an observer being present.

Adjustment of the zero position of the meter can be readily accomplished to make it possible to change the orientation with respect to the direction of gravity which is the pre-determined condition to be established by means of the instrument. Means can also be readily included to change the amplification of the meter, i.e. so that each division on the meter can be made to correspond to a pre-determined angle with which the device is out of level. The electric circuit of the device can also be constructed so that the intensity of the source of radiant energy is controlled by the output of the means which is responsive to de-centered radiant energy which effects a stabilization of the instrument to substantially eliminate such effects as the aging of the source of radiant energy and the responsive means. The device may also be used to control a monitoring circuit which will automatically level the device when it is out of level.

The above objects of the invention and the means for their attainment will be more fully understood by referring to the following description and the accompanying drawings, in which:

FIG. I is a view in plan partly in section of one embodiment of the new device.

FIG. II is a view in front elevation partly in section of the embodiment of the device shown in FIG. I.

FIG. III is a view in sectional side elevation taken along the line III—III of FIG. I and looking in the direction of the arrows.

FIG. IV is a view in sectional elevation taken along the line IV—IV of FIG. I and looking in the direction of the arrows.

FIG. V is a view in sectional elevation of another embodiment of the device.

FIG. VI shows an electronic circuit that may be used in any of the embodiments of FIGURES I-V.

In the embodiment of FIGS. I, II, III and IV, the radiant energy receiving means or means responsive to de-centered radiant energy is shown in FIG. I and in FIG. IV. In this particular case, the means responsive to de-centered radiation is made up of a beam-splitting prism 2 and two radiant energy detectors 4 and 6. It is also possible to obtain a detector which gives a response directly depending upon the centering of radiant energy thereon. Such detectors are commericially available. In this case, it would not be necessary to use a beam-splitter such as 2. The beam-splitter 2 in the present case must be of a type that divides approaching radiant energy into two beams of relative energy dependant upon the centering of the approaching light on the beam splitter. This is achieved very simply in the present case by using a right angle prism 2 with its edge at the right angle apex mounted in a horizontal plane and with the faces corresponding to the short legs of the right angle triangle mounted in planes at 45° to the horizontal. Thus the center of this beam-splitter is determined by the right angle apex edge. The light falling above this edge being reflected upward and any light falling below this edge being reflected downward. The upward reflected beam is again reflected into a horizontal direction by the right angle prism 8, on to the radiant energy detector 4. The downward reflected beam is again reflected by the right angle prism 10 on to the radiant energy detector 6. If the radiant energy is centered on the beam-splitting prism 2, the output of the detectors 4 and 6 will be approximately equal. On the other hand, if the radiant energy is centered above the center of the beam-splitting prism 2 the output of the detector 4 will tend to be greater than the output of the detector 6. Conversely, if the radiant energy is centered below the center of the beam-splitting prism 2 the output of the detector 6 will tend to be greater than the output of the detector 4.

The detectors 4 and 6 may be any of a wide variety of different types of photocells. These include photo-resistors such as lead sulphide, cadmium sulphide and cadmium selenide cells, photo-multipliers and photo-transistors as well as the ordinary selenium photocells and photo-tubes. However, the latter group, namely, the selenium photocells and photo-tubes, will probably only find use in less sensitive forms of the instrument. Because of their high sensitivity, photo-multiplier and photo-resistor types are preferred.

Referring to FIG. I, it is seen that the radiant energy receiving means or means responsive to de-centered radiant energy is mounted in the wall 12 of the enclosure 14. Also mounted in this wall of the enclosure is the radiation or illumination unit 16. This includes the lamp 18 or other source of radiant energy, the condensing lens 20 and means limiting the radiant energy to a compact bundle of rays or means 22 forming an aperture. In the present case, the aperture is in the form of a horizontal slit, because the device shown in this embodiment is intended only to indicate level in one plane. In cases where the device is constructed to indicate level in two perpendicular planes some other form of aperture may be used. The condensing lens 20 forms an image of the lamp filament 18 on the aperture 22 to provide maximum intensity of illumination of the aperture.

Mounted to the bottom of the housing 14 is a commercially available self-leveling pendulum controlled optical level 24 known as a Zeiss Ni2 level. This instrument is covered by Patent No. 2,779,231 which was issued on January 27, 1957. It is also described in a publication of the Zeiss Companying titled "Novel Surveyors Levels" by Bartin Drodofsky, the inventor and in an article by Dr. W. Schneider printed in the "Journal of Surveying," November 8–9, 1953 entitled "The Evolution of Modern Leveling Instruments with Special Reference to Instruments with Automatic Adjustment of the True Horizontal Line of Sight." The Zeiss level is also described in "Surveying and Mapping," April–June, 1954 issue, vol. 14, No. 2, pages 185–191 in an article by C. L. Peckinpaugh, Jr. For the sake of brevity, anything disclosed in the patent identified and the other publications pertaining to this level will be considered to be disclosed herein.

Further, FIGURE III schematically shows a portion of the internal construction of the Zeiss level corresponding to FIGURE II in the "Surveying and Mapping" article. In FIGURE III, the elements 25A and 25B are the telescope objective, 25C is the focusing lens, 25D and 25E are mirrors fixed to the telescope, 25F is the compensating mirror or radiant energy path modifying means, 25G are the wires supporting the mirror 25F, 25H is the reticle, and 25I are the lenses of the eyepiece.

The mirror 26 is mounted at the objective end of the self-leveling level 24 to reflect light which passes through the level 24 from the illumination source 16 back through the level 24 to the means responsive to de-centered illumination; i.e. the beam-splitting prism 2. This occurs as follows: The radiant energy enters the level 24 through the eyepiece lenses 25I and is reflected from the fixed mirror 25E to the radiant energy path modifying means or compensating mirror 25F from which it is reflected to the fixed mirror 25D and then passes through the focusing lens 25C and the telescope objectives 25B and 25A and then impinges upon mirror 26. The radiant energy is reflected from mirror 26 back through the telescope objectives 25A, 25B, through the focusing lens 25C and impinges upon the fixed mirror 25D from which it is reflected to the radiant energy path modifying means or compensating mirror 25F from which it is reflected to fixed mirror 25E and thence through the eyepiece lenses 25I and on toward the radiant energy receiving means or means responsive to de-centered radiant energy. The mounting of the radiation source and the means responsive to de-centered radiation in the wall 12 is such that the radiant beam enters the eyepiece of the level at an angle to the optical axis of the level in the horizontal plane and emerges at an angle at the opposite side of the optical axis and enters the means responsive to de-centered illumination. From the construction of the self-leveling optical level 24 described in the above references, it is apparent that the level is pendulum controlled. This is accomplished by means of three prisms mounted in the optical path of the level one of which is suspended on a pendulum so that the line of sight will be level. With the mirror 26 attached perpendicular to the line of sight, if the radiation entering the eyepiece is centered along a horizontal level line, the radiation leaving the eyepiece will also be centered along a horizontal level line. Thus if the slit at 22 and the edge of the beam-splitting prism 2 are mounted in the same horizontal plane, the output of the two detectors 4 and 6 will be substantially the same when the housing 14 is held level. The optical axis of the self-leveling level 24 should be mounted at approximately the same height from the base of the housing 14 as the slit at 22 and the edge of the beam-splitter 2.

If the housing 14 is not held level in a direction parallel to its longitudinal axis, the beam entering the self-leveling level 24 will not be horizontal and the beam leaving the self-leveling level will also not be horizontal so that the response of the two detectors 4 and 6 will be considerably different. Since the self-leveling level 24 has angular magnification, the angle that the returning beam makes with the horizontal will be greater than the angle that the entering beam makes with the horizontal by a factor equal to this angle of magnification. In addition to this effect, the angle will be doubled because of the reflection from the mirror 26. It should be understood that the eyepiece of the self-leveling level 24 should be de-focused so that the optical system of the level forms an image of the slit at 22 on the beam-splitter 2. The actual vertical displacement of the image of the slit at 22 on the beam-splitter 2 caused by the housing 14 being out of level in a direction parallel to its longitudinal axis by an angle $a$ in seconds will be $2 \times M \times a \times L \times 5 \times 10^{-6}$. M being the angular magnification of the optical level 24, L being the distance from the exit pupil of the level 24 to the beam-splitter prism 2 and $5 \times 10^{-6}$ being the sine of an angle of one second.

It might be expected that the sensitivity of the device could also be increased by decreasing the width of the slit at 22. However, since this would also reduce the intensity of illumination, it will reduce the outputs of the detectors 4 and 6 and the deflection of the meter which indicates the unbalance of these two detectors so that these two effects tend to compensate each other.

The housing 14 is provided with three feet 28, 30 and 32 adapted for mounting the device on any flat surface. The base of the housing 14 extends beyond the end walls thereof and handles 34 and 36 are provided. The housing is provided with a cover 38, this cover being removed in FIG. I. The cover may be held on the housing by screws as shown in FIG. II. If it is desired to use the device to determine whether a surface is at some pre-determined angle with respect to the horizontal a sine bar of the pre-determined angle can be placed on the surface under the three feet of the housing; otherwise the housing could be constructed to permanently include such an angle.

In the embodiment of FIG. V, the device is supported within a vertical tubular housing (114). As shown in this figure, the radiant energy receiving means or means responsive to de-centered radiation is mounted on the upper left wall of the vertical enclosure. This means includes a beam-splitting prism 102 similar to that shown in FIG. IV, two radiation energy detectors 104 and 106 which may be of any of the types previously discussed and two right angle prisms 108 and 110 for directing the split beams of light towards the detectors. All of these parts are carried on a mount 112 attached to the side wall of the vertical enclosure 114. The three prisms 102, 108 and 110 are cemented onto a glass plate 100 as shown which in turn is fastened to the mount 112 by the clips shown. The detectors 104 and 106 are carried in a plug mount 103 which is secured to the mount 112 by means of the screw 105.

The radiation unit 116 is mounted in a hole provided in the opposite side of the vertical tubular housing 114 near the top thereof in line with the radiant energy receiving means or means responsive to de-centered illumination provided in the opposite wall. The radiation or illumination unit includes a lamp 118 which is fed by an electrical cord 107 through the lamp socket 109. The lamp socket 109 is carried in the lamp housing 116 which is provided with fins for air cooling. The condensing lens 120 is secured in a mount 111 which is fastened to the lamp housing 116 and extends through the hole in the vertical enclosure 114 being held therein on a boss provided therefore by means of the screws 113. Means limiting the radiant energy to a compact bundle of rays or means forming an aperture 122 is provided at the other end of the tube 111. This means includes a mount 115 a reticule 117 which is opaque provided with a clear horizontal slit and a cover glass 119.

A radiation imaging means 124 having an angular magnification greater than unity is mounted vertically in a central location in the vertical enclosure 114. The housing for this optical system is attached to rings 147 which fit in the vertical housing 114 and are secured therein by screws as shown. The optical system is similar in construction to a telescope having an objective lens 149 and a pair of eyepiece or erector lenses 121 and 123. A right angle prism 125 is mounted vertically above the eye lens 123 as shown to reflect light passing through the aperture in the reticule 117 downward through the optical system. The lenses 123 and 124 form an image of the reticule slit 117 below the lens 121 at the focus of the objective lens 149. Light from this image therefor passes downward through the lens 149 as a collimated beam. A radiant energy path modifying means or mirror 126 is carried below the objective lens 149 on a pendulum arm 127. The collimated light passing downward through the objective lens 149 is reflected upward by the radiant energy path modifying means or mirror 126 through the lens 149 forming an image at the focus of this lens below the lens 121. This light passes through the lenses 121 and 123 and is reflected by the prism 125 against the beam-splitter 102. In fact, an image of the slit provided in the reticule 117 is formed on the beam-splitter 102.

The light passing downward through the lenses 123 and 121 is centered about an axis inclined to the optical axis of the optical system. The light passing upward through the lenses 121 and 123 is inclined at an angle to the axis of the optical system on the opposite side of the optical axis. The various parts of the instrument are adjusted so that when the housing 114 is oriented in a pre-determined manner with respect to the direction of gravity, and when the pendulum arm 127 is in equilibrium under the action of gravity, the image of the slit in the reticule 117 formed on the beam-splitting prism 102 is centered on the right angle apex edge of this prism which ordinarily means that the housing is resting on a level surface. The angle of the pendulum arm will change by an angular value equal to the angular change in the position of the housing from the pre-determined position. This angle will be doubled by reflection from the mirror 126 and further increased by a factor equal to the angular magnification of the optical system including the lenses 149, 121 and 123, so that the actual displacement of the image of the slit at the beam-splitting prism 102 will, as in the case of the previous embodiment, be equal to the angle, $a$, in seconds, by which the housing 114 has been deviated, $\times 2 \times M$, the angular magnification of the optical system, and $\times L$, the distance from the exit pupil of the optical system to the beam-splitting prism 102, $\times 5 \times 10^{-6}$ which is the sine of an angle of one second.

As shown the mirror 126 is centered by a ball 129 and held thereon by three spring clips 131. This permits an angular adjustment of the mirror by means of the set screw 133 to bring the image of the slit onto the beam-splitting prism for the proper orientation of the housing 114. The mirror rests on two fixed stops as shown as well as the set screw 133.

The housing 114 is carried on a base 135 which is provided with three feet 128, 130 and 132 for supporting it on a flat surface. The top of the housing is enclosed by a cover 138 and the bottom is enclosed by the cup 137 which is held within the tubular housing 114 by set screws as shown. Magnets 139 are carried on top of the cup 137 and a vane 141 is secured to the pendulum arm 127 to swing between the poles of the magnets 139 to act as a magnetic damping means for the pendulum so that the pendulum will come quickly to rest under the action of gravity.

The electronic circuit shown in FIG. VI may be used for either the embodiment of FIGS. I, II, III and IV or the embodiment of FIG. V. In either case, the lamp should be connected to the two terminals shown and the two detectors should be connected at the positions marked "$P_1$" and "$P_2$." A suitable power supply must be provided with the circuit to supply a positive D.C. voltage B at the terminals indicated and a 6.3 volt A.C. voltage at the third terminal for exciting the filaments of the electronic tubes.

The left-hand portion of the circuit as shown in FIG. VI is essentially a Wheatstone bridge circuit with the photocells $P_1$ and $P_2$ and the resistors $R_1$ and $R_2$ connected in the four arms of the circuit. One end of each of the resistors $R_1$ and $R_2$ is connected to ground so that these ends of the resistors can be considered to be connected together. The junction between one terminal of the detector $P_1$ which in the circuit as illustrated is considered to be a photo-resistor and the resistor $R_1$ is connected through the series resistor $R_3$ and the amplifying tube $T_1$ to one end of the micro-ameter 200. Similarly the junction "B" between the photo-resistor $P_2$ and the resistor $R_2$ is connected through the resistor $R_4$ and the amplifier tube $T_2$ to the other side of the micro-ameter 200. The capacitors $C_3$ and $C_4$ connected to ground between the resistor $R_3$ and the tube $T_1$ and the resistor $R_4$ and the tube $T_2$ act as damping elements in conjunction with the resistors $R_3$ and $R_4$. The voltages at the junctions A and B control the grids of the triodes $T_1$ and $T_2$ so that any difference in these voltages is amplified to the plates of the triodes $T_1$ and $T_2$ which are connected to the micro-ameter 200.

The resistors $R_9$ and $R_{10}$ are the plate load resistors of the two triodes $T_1$ and $T_2$ and the variable resistor $R_5$ connected in series with these resistors is used to match the currents in both triodes so that the zero reading of the micro-ameter will correspond to the proper orientation of the instrument with respect to the direction of gravity. Actually, the variable resistor $R_5$ for setting the zero of the meter might be included in various other positions in the circuit with equally good results.

The variable resistor $R_6$ which is connected in parallel with the micro-ameter 200 controls the proportion of the current flow caused by the amplified voltage difference across the two photo-resistors which will flow through the meter 200. By varying this resistor, the angular equivalent of each meter division can be calibrated.

The voltage at C which is connected to the cathodes of both triodes $T_1$ and $T_2$ and to ground through a fixed resistor, is dependent upon the averaged response of both photo-resistors $P_1$ and $P_2$. This voltage at C serves as an amplification control of the tube $T_3$ which is further amplified through the tubes $T_4$ and $T_5$ and ultimately controls the voltage supplied to the lamp through the transformer shown. $R_7$ controls the negative feed-back factor and thereby the illumination intensity of the lamp. By means of this negative feed-back arrangement, a stabilization of the electronic circuit is achieved so that such factors as the aging of the lamp causing a reduction in the light intensity and aging effects on the two photo-resistors $P_1$ and $P_2$ have virtually no influence on the performance of the instrument. Temperature effects on the two photo-resistors $P_1$ and $P_2$ can also be eliminated by means of the negative feed-back arrangement if the temperature co-efficients of these photo-resistors are both equal. If they are unequal, it may be necessary to control the temperature in the part of the instrument where the photocells are located by means of some type of thermostatic control.

Having thus described the invention what is claimed is:

1. A level indicating device, comprising a support for mounting on a surface to determine the levelness of the surface, means mounted in the path of a source of radiant energy limiting said radiant energy to a compact bundle of rays of radiant energy, radiant energy receiving means for receiving said bundle of rays, said radiant energy receiving means comprising electrically responsive means responsive to the de-centering of the bundle of rays from a center position on said radiant energy receiving means, radiant energy path modifying means mounted optically between said radiant energy source and said radiant energy receiving means in the path of said bundle of rays of radiant energy for varying the path of said rays between said ray limiting means and said radiant energy receiving means, and means mounted on said support for movably mounting one of said ray limiting means, radiant energy path modifying means, and radiant energy receiving means responsive to the force of gravity acting thereon in accordance with the position of said support with respect to gravitational forces and the surface which is being checked for levelness; whereby said bundle of rays is displaced with respect to said radiant energy receiving means an amount depending upon the position of said support, the other two means being stationary with respect to said support, and means responsive to said radiant energy receiving means to indicate in response to the de-centering of the bundle of rays with respect to said radiant energy receiving means the direction of de-centering and the magnitude thereof wherby the user may accurately interpret the extent of de-centering which is an indication of the levelness of the surface providing information for making any necessary adjustments in accordance with the information received.

2. A level indicating device, comprising a support for mounting on a surface to determine the levelness of the surface, means mounted in the path of a source of radiant energy limiting said radiant energy to a compact bundle of rays of radiant energy, radiant energy receiving means for receiving said bundle of rays, said radiant energy receiving means comprising a beam splitter prism, and electrically responsive means responsive to the de-centering of the bundle of rays from a center position on said beam splitter prism; radiant energy path modifying means mounted optically between said radiant energy source and said radiant energy receiving means in the path of said bundle of rays of radiant energy for varying the path of said rays between said ray limiting means and said beam splitter prism, and means mounted on said support for movably mounting one of said ray limiting means, radiant energy path modifying means, and radiant energy receiving means responsive to the force of gravity acting thereon in accordance with the position of said support with respect to gravitational forces and the surface which is being checked for levelness; whereby said bundle of rays is displaced with respect to said beam splitter prism an amount depending upon the position of said support, the other two means being stationary with respect to said support, and means responsive to said radiant energy receiving means to indicate in response to the de-centering of the bundle of rays with respect to said beam splitter prism the direction of de-centering and the magnitude thereof whereby the user may accurately interpret the extent of de-centering which is an indication of the levelness of the surface providing information for making any necessary adjustments in accordance with the information received.

3. A level indicating device, comprising a support for mounting on a surface to determine the levelness of the surface, means mounted in the path of a source of radiant energy limiting said radiant energy to a compact bundle of rays of radiant energy, radiant energy receiving means for receiving said bundle of rays, said radiant energy receiving means comprising electrically responsive means responsive to the de-centering of the bundle of rays from a center position on said radiant energy receiving means, reflector means mounted optically between said radiant energy source and said radiant energy receiving means in the path of said bundle of rays of radiant energy for varying the path of said rays between said ray limiting means and said radiant energy receiving means, and means mounted on said support for movably mounting one of said ray limiting means, reflector means, and radiant energy receiving means responsive to the force of gravity acting thereon in accordance with the position of said support with respect to gravitational forces and the surface which is being checked for levelness; whereby said bundle of rays is displaced with respect to said radiant energy receiving means an amount depending upon the position of said support, the other two means being stationary with respect to said support, and means responsive to said radiant energy receiving means to indicate in response to the de-centering of the bundle of rays with respect to said radiant energy receiving means the direction of de-centering and the magnitude thereof whereby the user may accurately interpret the extent of de-centering which is an indication of the levelness of the surface providing information for making any necessary adjustments in accordance with the information received.

4. A level indicating device, comprising a support for mounting on a surface to determine the levelness of the surface, means forming an aperture for limiting said radiant energy to a compact bundle of rays of radiant energy, radiant energy receiving means for receiving said bundle of rays, said radiant energy receiving means comprising electrically responsive means responsive to the de-centering of the bundle of rays from a center position on said radiant energy receiving means, radiant energy path modifying means mounted optically between said radiant energy source and said radiant energy receiving means in the path of said bundle of rays of radiant energy for varying the path of said rays between said aperture means and said radiant energy receiving means, and means mounted on said support for movably mounting one of said means forming an aperture, radiant energy path modifying means, and radiant energy receiving means responsive to the force of gravity acting thereon in accordance with the position of said support with respect to gravitational forces and the surface which is being checked for levelness; whereby said bundle of rays is displaced with respect to said radiant energy receiving means an amount depending upon the position of said support, the other two means being stationary with respect to said support, and means responsive to the radiant energy receiving means to indicate in response to the de-centering of the bundle of rays with respect to said radiant energy receiving means the direction of de-centering and the magnitude thereof whereby the user may accurately interpret the extent of de-centering which is an indication of the levelness of the surface providing information for making any necessary adjustments in accordance with the information received.

5. A level indicating device, comprising a support for mounting on a surface to determine the levelness of the surface, means forming an aperture in the path of a source of radiant energy for limiting said radiant energy to a compact bundle of rays of radiant energy, radiant energy receiving means for receiving said bundle of rays, said radiant energy receiving means comprising electrically responsive means responsive to the de-centering of the bundle of rays from a center position on said radiant energy receiving means, radiant energy path modifying means mounted optically between said radiant energy source and said radiant energy receiving means in the path of said bundle of rays of radiant energy for varying the path of said rays between said aperture means and said radiant energy receiving means, a system of lenses having an angular magnification greater than unity carried by said support, means directing light from said aperture means through said system of lenses against said radiant energy path modifying means, said light being reflected back through said system of lenses by said radiant energy path modifying means, means directing the light reflected back through said lens system towards said radiant energy receiving means, and means mounted on said support for movably mounting one of said aperture means, radiant energy path modifying means, and radiant energy receiving means responsive to the force of gravity acting thereon in accordance with the position of said support with respect to gravitational forces and the surface which is being checked for levelness; whereby said bundle of rays is displaced with respect to said radiant energy receiving means an amount depending upon the position of said support, the other two means being stationary with respect to said support, and means responsive to said radiant energy receiving means to indicate in response to the de-centering of the bundle of rays with respect to said radiant energy receiving means the direction of de-centering and the magnitude thereof whereby the user may accurately interpret the extent of de-centering which is an indication of the levelness of the surface providing information for making any necessary adjustments in accordance with the information received.

6. A level indicating device, comprising a support for mounting on a surface to determine the levelness of the surface, means mounted in the path of a source of radiant energy limiting said radiant energy to a compact bundle of rays of radiant energy, radiant energy receiving means for receiving said bundle of rays, said radiant energy receiving means comprising electrically responsive means responsive to the de-centering of the bundle of rays from a center position on said radiant energy receiving means, radiant energy path modifying means mounted optically between said radiant energy source and said radiant energy receiving means in the path of said bundle of rays of radiant energy for varying the path of said rays to cause said bundle of rays to be displaced with respect to said radiant energy receiving means, and means mounted on said support movably mounting said radiant energy path modifying means in response to the force of gravity acting thereon in accordance with the position of said support with respect to gravitational forces and the surface which is being checked for levelness; whereby said bundle of rays is displaced with respect to said radiant energy receiving means an amount depending upon the position of said support, and means responsive to said radiant energy receiving means to indicate in response to the de-centering of the bundle of rays with respect to said radiant energy receiving means the direction of de-centering and the magnitude thereof whereby the user may accurately interpret the extent of decentering which is an indication of the levelness of the surface providing information for making any necessary adjustments in accordance with the information received.

7. A level indicating device, comprising a support for mounting on a surface to determine the levelness of the surface, means mounted in the path of a source of radiant energy for limiting said radiant energy to a compact bundle of rays of radiant energy, radiant energy receiving means for receiving said bundle of rays, said radiant energy receiving means comprising a beam splitter prism that divides approaching radiant energy into two beams of relative energy dependent upon the centering of the approaching radiant energy thereupon, and two radiant energy detectors one in the path of each of said divided beams, two resistors connected to said radiant energy detectors to form a Wheatstone Bridge circuit, radiant energy path modifying means mounted optically between said radiant energy source and said radiant energy receiving means in the path of said bundle of rays of radiant energy for varying the path of said rays between said ray limiting means and said radiant energy receiving means, and means mounted on said support for movably mounting one of said ray limiting means, radiant energy path modifying means, and radiant energy receiving means responsive to the force of gravity acting thereon in accordance with the position of said support with respect to gravitational forces and the surface which is being checked for levelness; whereby said bundle of rays is displaced with respect to said radiant energy receiving means an amount depending upon the position of said support, the other two means being stationary with respect to said support, and means connected to said Wheatstone Bridge circuit for determining the unbalance thereof and to indicate in response to the de-centering of the bundle of rays with respect to said radiant energy receiving means the direction of de-centering and the magnitude thereof whereby the user may accurately interpret the extent of de-centering which is an indication of the levelness of the surface providing information for making any necessary adjustments in accordance with the information received.

8. A level indicating device, comprising a support for mounting on a surface to determine the levelness of the surface, a source of radiant energy, means mounted in the path of said source of radiant energy for limiting said radiant energy to a compact bundle of rays of radiant energy, radiant energy receiving means for receiving said bundle of rays, said radiant energy receiving means comprising a beam splitter prism that divides approaching radiant energy into two beams of relative energies dependent upon the centering of the approaching radiant energy thereupon, two radiant energy detectors one in the path of each of said divided beams, two resistors connected to said radiant energy detectors to form a Wheatstone Bridge circuit, and an electronic tube controlled by the mean value of both detector outputs, said electronic tube controlling the output of the source of radiant energy to keep the mean value of both detector outputs constant, radiant energy path modifying means mounted optically between said radiant energy source and said radiant energy receiving means in the path of said bundle of rays of radiant energy for varying the path of said rays between said ray limiting means and said radiant energy receiving means, and means mounted on said support for movably mounting one of said ray limiting means, radiant energy path modifying means, and radiant energy receiving means responsive to the force of gravity acting thereon in accordance with the position of said support with respect to gravitational forces and the surface which is being checked for levelness; whereby said bundle of rays is displaced with respect to said radiant energy receiving means an amount depending upon the position of said support, the other two means being stationary with respect to said support, and means connected to said Wheatstone Bridge circuit for determining the unbalance thereof and to indicate in response to the de-centering of the bundle of rays with respect to said radiant energy receiving means the direction of de-centering and the magnitude thereof whereby the user may accurately interpret the extent of de-centering which is an indication of the levelness of the surface providing information for making any necessary adjustments in accordance with the information received.

References Cited in the file of this patent

UNITED STATES PATENTS

| | | |
|---|---|---|
| 2,037,030 | Kolmorgen | Apr. 14, 1936 |
| 2,304,814 | Glasser | Dec. 15, 1942 |
| 2,460,836 | Lovins | Feb. 8, 1949 |
| 2,462,925 | Varian | Mar. 1, 1949 |
| 2,503,422 | Silverman | Apr. 11, 1950 |
| 2,503,423 | Silverman | Apr. 11, 1950 |
| 2,549,402 | Vossberg | Apr. 17, 1951 |
| 2,649,834 | Sweet | Aug. 25, 1953 |
| 2,680,990 | Sweet | June 15, 1954 |
| 2,692,527 | Wetzel et al. | Oct. 26, 1954 |
| 2,703,505 | Senn | Mar. 8, 1955 |
| 2,779,231 | Drodofsky | Jan. 29, 1957 |

FOREIGN PATENTS

| | | |
|---|---|---|
| 202,010 | Australia | May 30, 1956 |